United States Patent [19]

Choji et al.

[11] Patent Number: 5,611,612
[45] Date of Patent: Mar. 18, 1997

[54] VEHICULAR LAMP HAVING WATERPROOF COVER

[75] Inventors: Masataka Choji; Naoshi Kawamura, both of Shizuoka, Japan

[73] Assignee: Koito Manufacturing Co., Ltd., Tokyo, Japan

[21] Appl. No.: 399,464

[22] Filed: Mar. 7, 1995

[30] Foreign Application Priority Data

Mar. 9, 1994 [JP] Japan .................................. 6-064413

[51] Int. Cl.⁶ .................................................. B60Q 1/00
[52] U.S. Cl. .............................. 362/61; 362/267; 362/310
[58] Field of Search ............................... 362/61, 267, 310

[56] References Cited

U.S. PATENT DOCUMENTS 5,130,904  7/1992  Ohshio et al. ............................ 362/61
5,172,972 12/1992  Terao ...................................... 362/310
5,442,525  8/1995  Tsukada ................................... 362/61

Primary Examiner—Denise L. Gromada
Assistant Examiner—Sara Sachie Raab
Attorney, Agent, or Firm—Sughrue, Mion, Zinn, Macpeak & Seas

[57] ABSTRACT

In a vehicular lamp with a waterproof cover, a cylindrical upright wall extends along the circumferential edge of the opening of the lamp body into which a bulb socket supported by the reflector is inserted. The waterproof cover for waterproofing the opening is made of a watertight elastic material. The inner portion of the waterproof cover is in close contact with the circumferential surface of the reflector or a bulb socket. The outer portion of the waterproof cover is fitted to the upright wall in a state such that the upright wall is sandwiched by the outer portion.

9 Claims, 10 Drawing Sheets

VEHICULAR LAMP HAVING WATERPROOF COVER

BACKGROUND OF THE INVENTION

The present invention relates to a vehicular lamp, and more particularly to a vehicular lamp having a waterproof cover for sealing the opening in a lamp body into which a bulb socket is inserted.

A vehicular lamp having an aiming mechanism incorporated therein is generally constructed as shown in FIG. 11. As shown, a lens 102 is mounted on the front opening of a lamp body 101 to thereby form a lamp chamber 103. A reflector 104 is mounted within the lamp chamber 103 in such a manner as to be tiltable horizontally and vertically.

A bulb 106 is inserted into a bulb socket 105, which is removably attached to the reflector 104. For this purpose, a relatively large bulb insertion hole 107 is formed in the rear side of the lamp body 101. A bulb socket mounting portion 108 of the reflector and the bulb socket 105 (referred to as bulb socket components) are exposed to the exterior through the bulb insertion hole 107 so as to allow for electrical connection by means of a connector or the like. Unless the bulb insertion hole 107 is made larger in diameter than the bulb socket 105, when the reflector 104 is tilted for an aiming adjustment, the bulb socket components 105 would interfere with the lamp body 101. It is for this reason that the bulb insertion hole 107 is provided.

A waterproof cover 109 is fitted in the space between the bulb socket components 105 and the bulb insertion hole 107 for waterproofing purposes. As shown in FIG. 12(a), which shows a radial portion of the waterproof cover 109 in an enlarged form, the waterproof cover 109, which has the form of a ring-like plate made of a water-tight elastic material such as rubber, consists of an inner portion 110, a thick outer portion 111, and a middle portion 112, shaped wavy in cross section, connecting the inner portion 110 and the outer portion 111. The inner portion 110 closely contacts the circumferential outer surface. The outer portion 111 is fitted to a tubular wall 113 of the bulb insertion hole 107. The outer portion 111, which is applied to the tubular wall 113, closely contacts the tubular wall 113 due to the elasticity of the waterproof cover 109.

In order to obtain more reliable coupling of the tubular wall 113 with the outer portion 111, the coupling structure may be modified by providing a ring-like strip 113a around the circumferential outer surface of the tubular wall 113, while a ring-like groove 111a, which receives the raised strip 113a of the tubular wall 113, is formed in the inner surface of the outer portion 111.

In the conventional waterproof cover where the outer portion 111 of the waterproof cover 109 is applied to the outer side of the tubular wall 113 of the bulb insertion hole 107 of the lamp body 101, the elasticity of the waterproof cover 109 deforms the outer portion 111 outwardly in the radial direction. That is, after the outer portion 111 of the waterproof cover 109 is applied to the tubular wall 113, the elasticity of the waterproof cover deforms the outer portion 111 as shown in FIG. 12(b). In this deformed state, the contact area of the outer portion 111 against the outer surface of the tubular wall 113 is narrowed, so that the waterproofing ability is reduced between the outer portion 111 and the tubular wall 113.

To mount the waterproof cover 109, the outer portion 111 thereof must be expanded against the elastic force thereof so as to cover the tubular wall 113 of the bulb insertion hole 107. To expand the outer portion, a large force is required, thus making it difficult to apply the outer portion 111 to the tubular wall 113. If the elasticity of the waterproof cover 109 is increased to improve the contact of the outer portion 111 with the tubular wall 113 for the purpose of improving the waterproofing ability, a further increased force is required for expanding the outer portion 111. The work required to apply the waterproof cover 109 is also more difficult. In the case where the raised strip 113a is provided on the tubular wall 113, the outer portion 111 must be expanded beyond the raised strip 113a. Thus, the force required is further increased, resulting in more difficulty in mounting the waterproof cover.

As shown in FIG. 12(c), when the reflector 104 is tilted for performing an aiming adjustment after the waterproof cover 109 has been mounted on the bulb insertion hole 107, the bulb socket components 105 are tilted together with the tilting motion of the reflector 104. The middle portion 112 of the waterproof cover 109 is deformed in the direction of its thickness. In some cases, a part of the bulb socket components 105 may contact the waterproof cover 109. In the contacting state, the bulb socket components 105 can interfere with the reflector 104 during tilting motion. The operation for the aiming adjustment is thus hindered.

SUMMARY OF THE INVENTION

Accordingly, an object of the present invention is to provide a vehicular lamp with a waterproof cover which ensures a more reliable waterproof connection in the bulb socket insertion opening of the lamp body.

Another object of the present invention is to provide a vehicular lamp with a waterproof cover which provides an easy application of the waterproof cover and an improved waterproofing ability.

Still another object of the present invention is to provide a vehicular lamp with a waterproof cover which undergoes no interference of the waterproof cover with the bulb socket components even under the deformation of the waterproof cover and ensures a smooth motion of the related component parts for the aiming adjustment.

In a vehicular lamp with a waterproof cover according to the present invention, a cylindrical upright wall is erected along the circumferential edge of the opening of the lamp body, into which a bulb socket supported by the reflector is inserted. The waterproof cover for sealing the opening is made of water tight, elastic material. The inner portion of the waterproof cover is brought into close contact with the circumferential surface of the reflector or a bulb socket. The outer portion of the waterproof cover is fitted to the upright wall in a state that the upright wall is sandwiched by the outer portion.

The waterproof cover is made of rubber. The outer portion, shaped like a "U" in cross section, of the waterproof cover consists of the inner part and the outer part, which are connected by a connection part. The outer portion of the waterproof cover is fitted to the upright wall in a state that the upright wall is sandwiched by the inner part and the outer part of the outer portion of the waterproof cover.

A ring-like protruded engaging part is protruded toward the inner side from the inner surface of the upright wall. An engaging part which comes in engagement with the protruded engaging part is contained in the inner part of the outer portion of the waterproof cover. The protruded engaging part is made to engage the engaging part of the inner part of the outer portion in the axial direction of the opening.

In the present invention, the outer portion of the waterproof cover is fitted to the upright wall of the lamp body in a state that it sandwiches the upright wall. Accordingly, when the waterproof cover is elastically restored after it is mounted, deformation of the outer portion of the waterproof cover is minimized, a close contact is secured between the upright wall and the outer portion of the waterproof cover, and good waterproofing is obtained.

The outer portion of the waterproof cover is shaped like a "U" in cross section. To mount the waterproof cover, the upright wall is fitted into the U-shaped space of the outer portion, and the three sides of the upright wall are enclosed. Because of this, a reliable waterproofing effect is obtained. The waterproof cover may be mounted by merely inserting the upright wall into the U-shaped space of the outer portion of the waterproof cover. In this sense, the mounting work of the waterproof cover is easy.

The protruded engaging part protruded from the inner surface of the upright wall is made to engage the engaging part of the inner part of the outer portion in the axial direction of the opening. Accordingly, the outer portion of the waterproof cover is prevented from slipping off the upright wall, and a reliable engaging state thereof is ensured, and the waterproofing effect is further enhanced.

Particularly, the engaging part 38 and the protruded engaging part 17A are located on the inner side of the opening. This allows the middle portion 33 to be located closer to the inner side of the opening. The connector of the bulb never interferes with the waterproof cover, thereby ensuring a smooth motion of the related component parts for the aiming adjustment.

BRIEF DESCRIPTION OF THE DRAWINGS

Other objects, features, and advantages of the present invention will be apparent when carefully reading the following detailed description in connection with the accompanying drawings in which.

DESCRIPTION OF THE PREFERRED EMBODIMENTS

Preferred embodiments of the present invention will be described with reference to the accompanying drawings.

Figure 1:
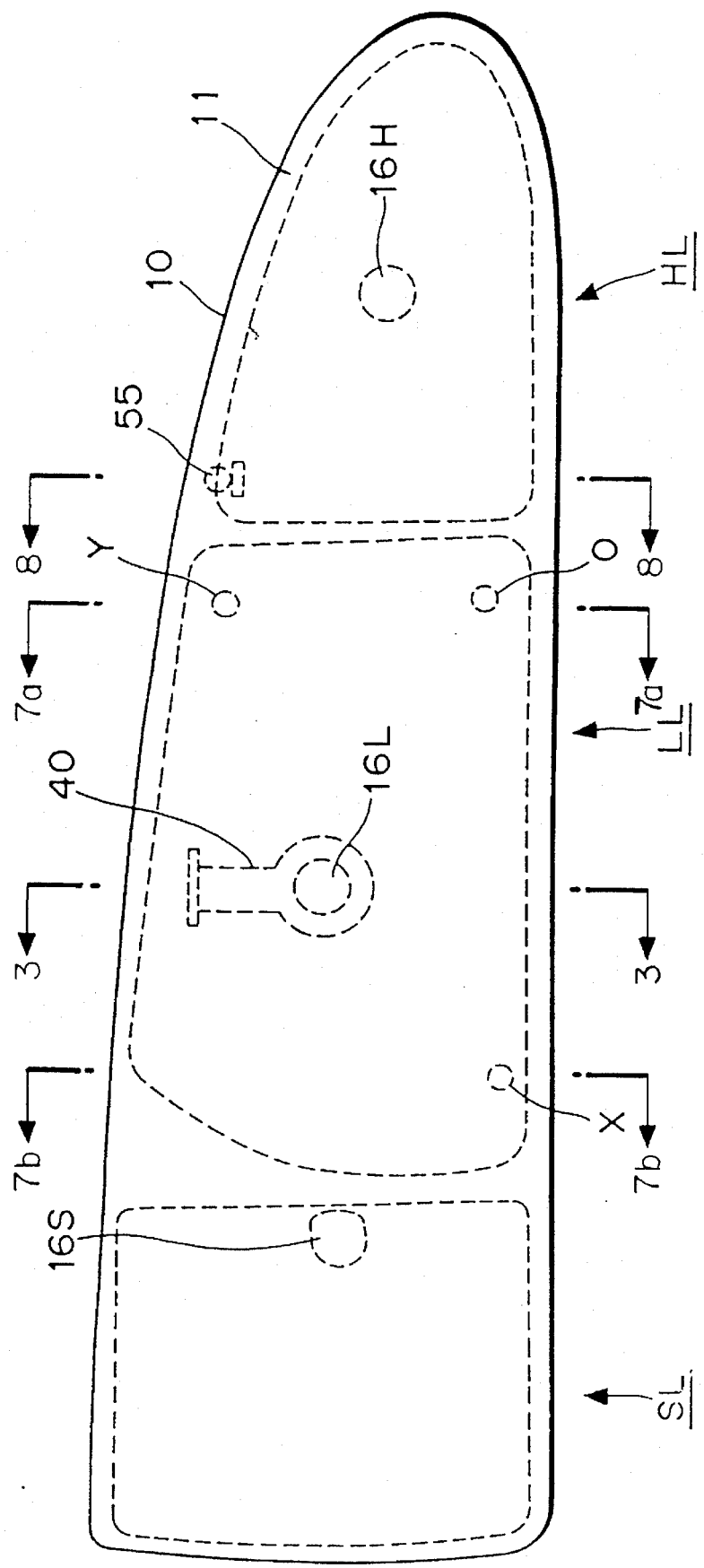
FIG. 1 is a front view showing an embodiment of the present invention in the form of a combination headlamp for a motor vehicle.
Figure 2:
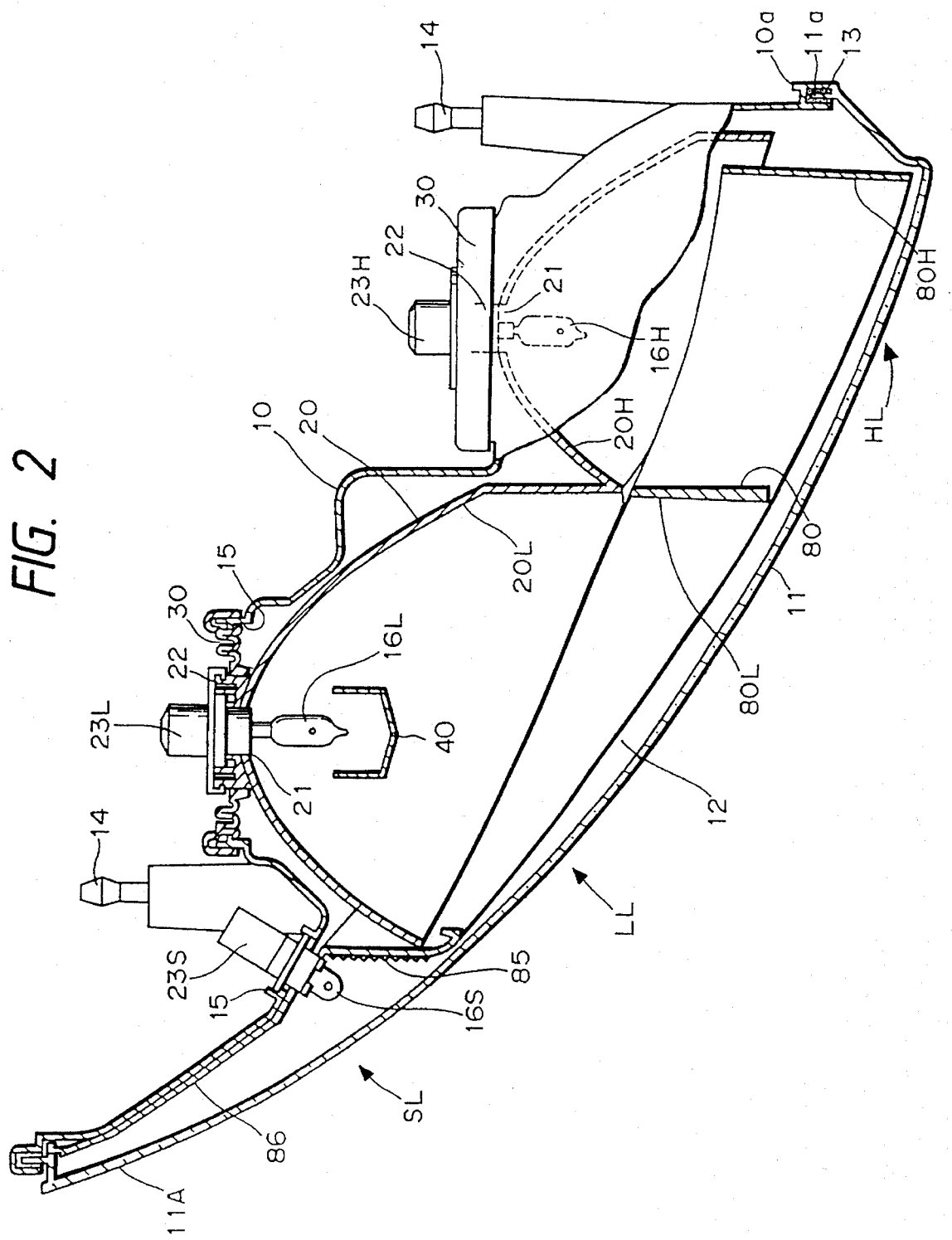
FIG. 2 is a horizontal sectional view of the combination headlamp of FIG. 1.

FIG. 1 is a front view showing an embodiment of the present invention in the form of a combination headlamp for a motor vehicle. FIG. 2 is a horizontal sectional view of the combination headlamp of FIG. 1.

A lamp body 10, made of black resin, is horizontally elongated in shape. A lens 11, made of transparent resin, is mounted on the front opening of the lamp body 10. The lens 11 and the lamp body 10 define a lamp chamber 12. A seal leg 11a, integral with the lens 11, protrudes rearward from the peripheral edge of the lens 11. The seal leg 11a is inserted into a seal groove 10a formed in the peripheral edge of the lamp body 10, and hermetically fastened thereto by sealer 13, such as hot melt. A plural number of stud pins 14 are provided on the rear side of the lamp body 10. These stud pins 14 are used for mounting the lamp to a vehicle body (not shown).

The lamp chamber 12 in the lamp body 10 is divided into three lamp sections, arrayed horizontally. In the present embodiment, as shown in FIG. 1, the right lamp section is for a high beam lamp (running lamp) HL, the middle lamp section is for a low beam lamp (passing lamp) LL, the left lamp section is for a side marker lamp (clearance lamp) SL. In the rear side of the lamp body 10, bulb insertion holes 15 of a relatively large diameter are formed at locations corresponding to the high beam lamp HL and the low beam lamp LL. A bulb insertion hole 15 of a relatively small diameter is formed at a location corresponding to the side marker lamp SL. As will be described later, bulbs 16H, 16L and 16S are inserted into respective ones of the bulb insertion holes 15, and are supported in the lamp sections of the lamp chamber.

Within the lamp chamber 12, a reflector 20 is disposed in a state that it ranges from the high beam lamp HL to the low beam lamp LL. The bulbs 16H and 16L for the high beam lamp and the low beam lamp are held by the reflector 20. The reflector 20, formed by molding, includes reflecting surface portions 20H and 20L, each shaped as a hyperboloid of revolution, which are arrayed side by side at locations corresponding to the high beam lamp HL and the low beam lamp LL. The front sides of the reflecting surface portions 20H and 20L are coated with aluminum by coating or vapor deposition to thereby form reflecting surfaces. A socket insertion hole 21 is formed at the top of the rear side of each of the reflecting surface portions 20H and 20L. A cylindrical socket mounting portion 22 of each reflecting surface portion is located around the socket insertion hole 21.

Figure 3:
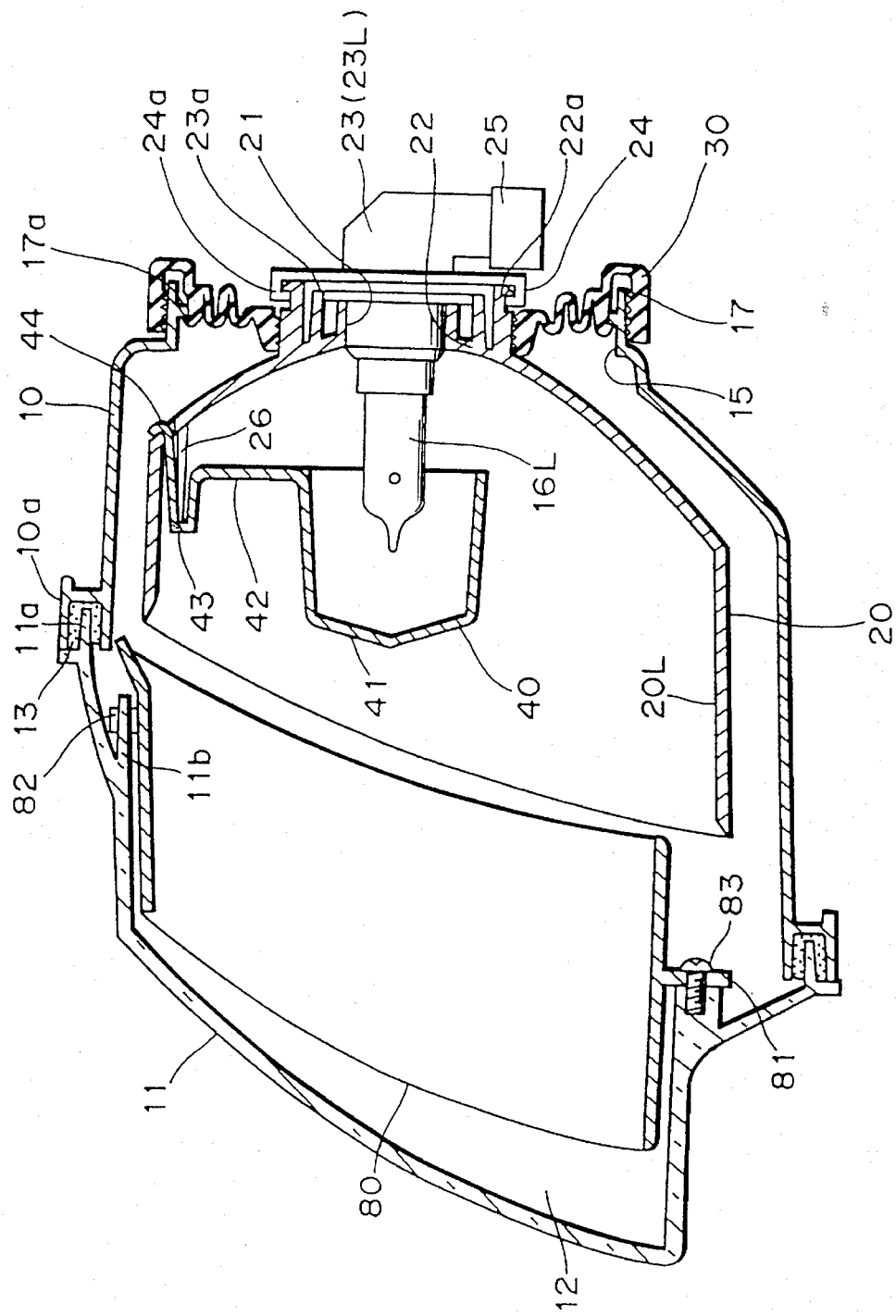
FIG. 3 is an enlarged cross-sectional view taken on a line A—A in FIG. 1.

FIG. 3 is an enlarged cross-sectional view taken on line 3—3 in FIG. 1. As shown in FIG. 3, a bulb socket 23 (23H, 23L) is inserted into the socket insertion hole 21 and fixed to the socket mounting portion 22. The bulb 16L is held by the bulb socket 23 so as to position the bulb 16L within the reflecting surface portion 20L (20H). The bulb socket 23 is provided with a circular flange 23a. The circular flange 23a is brought into contact with the rear side of the socket mounting portion 22. Further, a fixing ring 24 is fitted to the socket mounting portion 22, while being applied to the circular flange 23a. That is, the bulb socket 23 is fastened to the reflector 20 in a state such that the circular flange 23a is held between the socket mounting portion 22 and the fixing ring 24. In this embodiment, the fixing ring 24 has lance-like engaging parts 24a formed at plural positions thereof. Collars 22a, equal in number to the lance-like engaging parts 24a, are formed on the circumferential edge of the socket mounting portion 22. The bulb socket 23 is set to and removed from the socket mounting portion 22 by engaging the lance-like engaging parts 24a with the collars 22a and disengaging the lance-like engaging parts 24a from the collars 22a. The rear part of the bulb socket 23 is bent substantially rectangularly to form a connector 25 containing electrodes. A connector connected to an electric cord, not shown, is applied to the connector 25 to thereby supply electric power to the bulb 16L.

Figure 4A:
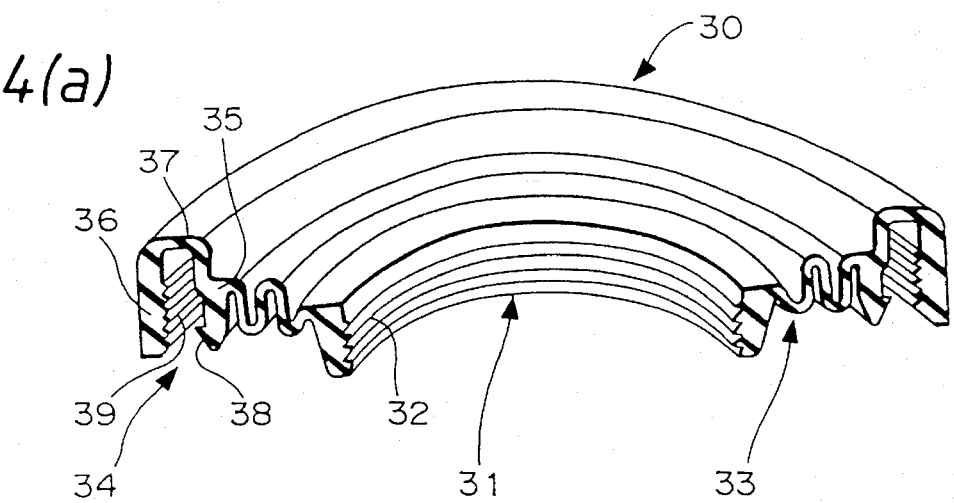
FIG. 4(a) is a perspective view showing a part of a waterproof cover.

A waterproof cover 30 made of ring-plate like rubber or resin is used for closing a ring-like gap between the circumferential surface of the socket mounting portion 22 and the bulb insertion hole 15. FIG. 4(a) is a perspective view showing a part of the waterproof cover 30. An inner portion 31 of the waterproof cover 30 is a thick cylindrical part of which the inner diameter is substantially equal to the outer diameter of the socket mounting portion 22. A plural number of ring-like grooves 32, arrayed in the axial direction, are formed in the inner surface of the inner portion 31. Due to the provision of the ring-like grooves 32, the inner portion 31 resiliently contacts the circumferential surface of the socket mounting portion 22. The ring-like grooves 32 provide closer contact of the inner portion 31 with the socket mounting portion 22, thereby improving the waterproofing characteristics.

A middle portion 33 has a wavy shape in cross section. Due to the wavy shape of the middle portion 33, the waterproof cover 30 has resiliency both in the thickness direction and in the diametric direction. The inner edge of the middle portion 33 is continuous to the outer edge of the upper side of the inner portion 31, while the outer edge of the middle portion 33 is continuous to the middle part of the inner part 35 of an outer portion 34, as will be explained in more detail below.

The outer portion 34, shaped like a U in cross section, of the waterproof cover 30 consists of the inner part 35 and an outer part 36, both being relatively thick. The inner and outer parts 35 and 36 are connected by a thin connection part 37. A lance is formed over the top edge of the outer surface of the inner part 35. The lance-shaped top edge serves as an engaging part 38. A plural number of ring-like grooves 39, arrayed in the axial direction, are formed in the inner surface of the outer part 36.

Figure 4B:
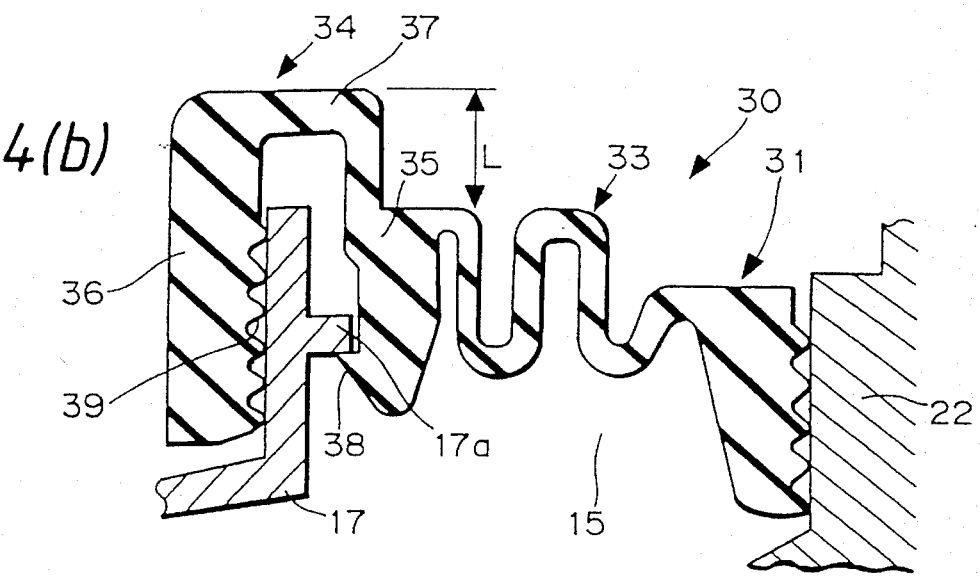
FIG. 4(b) is a cross-sectional view showing a key portion of the waterproof cover.

Reference is made to FIG. 4(b) showing an enlarged cross-sectional view of a part of the coupling structure of the waterproof cover 30. As shown, the outer portion 34 of the waterproof cover 30 is resiliently fitted to a ring-like upright wall 17 upwardly extending from the circumferential edge of the bulb insertion hole 15 of the lamp body 10. A ring-like protruded engaging part 17a protrudes toward the inner side from the inner surface of the upright wall 17. The upright wall 17 is received by the U-shaped space defined by the inner part 35, the outer part 36 and the connection part 37 of the outer portion 34.

In this state, the ring-like groove 39 of the outer part 36 is brought into contact with the outer surface of the upright wall 17, and the engaging part 38 of the inner part 35 engages the protruded engaging part 17a on the inner surface of the upright wall 17. Due to the engagement of the engaging part 38 with the ring-like protruded engaging part 17a in the inner part 35, the inner part 35 is prevented from slipping off the upright wall 17, and the outer part 36 prevented from slipping off the upright wall 17. As a result, engagement of the outer portion 34 with the upright wall 17 is ensured. The contact of the ring-like grooves 39 of the outer part 36 with the outer surface of the upright wall 17 is made more tight. The waterproofing ability of the structure composed of those component parts is improved. It is preferable that the outer part 36 and at least a portion of the inner part 35 are made thicker than the thin connection part 37 to effectively prevent the impact from being transmitted from the socket mounting portion 22 to the upright wall 17. Further, it is also preferable that the thin connection part 37 is made thicker than the middle portion 33 thereby to keep the desired shape of the outer part 36 and the inner part 35.

In the coupling structure of the outer portion 34 of the waterproof cover 30, the three sides of the upright wall 17 are enclosed by the inner part 35, the outer part 36 and the thin connection part 37. With this structure, because the contact area of the outer portion 34 with the upright wall 17 is large, the waterproofing ability is improved. That is, the waterproofing ability of the outer portion 34 is increased without an attendant increase in the elasticity of the waterproof cover 30. Moreover, only a small force is required for elastically deforming the waterproof cover 30 when the outer portion 34 is applied to the upright wall 17. Also, the mounting of waterproof cover 30 is easy.

It is noted that the ring-like protruded engaging part 17a, which comes in engagement with the engaging part 38, protrudes from the inner side of the upright wall 17. With this feature, when the outer portion 34 is applied to the upright wall 17, the inner part 35 is elastically deformed radially inwardly, while the outer part 36 must be elastically deformed radially outwardly. Particularly, the radial elastic deformation of the inner part 35 toward the inner side is easy since the waterproof cover 30 is shaped like a ring. This leads to easy mounting of the waterproof cover 30.

In the above-described embodiment, the protruded engaging part 17a protrudes from the inner surface of the upright wall 17 toward the inner part of the lamp body 10 in the opening defined by the upright wall 17 upwardly extending from the circumferential edge of the bulb insertion hole 15 of the lamp body 10. Accordingly, the engaging part 38, i.e., the inner end of the inner part 35, is also located closer to the inner part of the lamp body 10. Further, the middle portion 33 connecting to the inner part 35 may be located at a level a distance L lower than the rear end of the outer portion 34. With this feature, when the reflector 20 and the bulb socket 23 are tilted for the aiming adjustment, there is less chance that the waterproof cover 30 will interfere with the connector 25 of the bulb socket 23. Smooth motion of the reflector 20 and the bulb socket 23 is assured in the aiming adjustment.

Figure 4C:
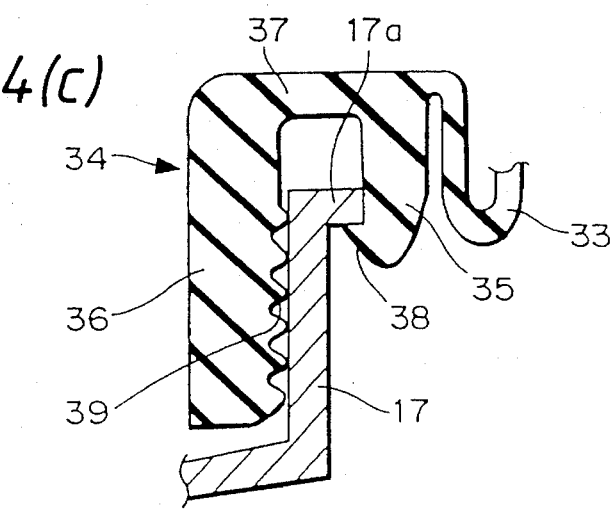
FIG. 4(c) is a cross-sectional view showing a key portion of another waterproof cover.

A modification of the coupling structure of the outer portion 34 of the waterproof cover 30 is shown in FIG. 4(c). In the modification, the inner part 35 is shorter than the outer part 36 when viewed in the axial direction. The extension of the engaging part 38 toward the opening is reduced. In this state, the protruded engaging part 17a of the upright wall 17 is located at the edge of the opening. In this modified structure, the length required for applying the inner part 35 to the upright wall 17 and for bringing the engaging part 38 into engagement with the protruded engaging part 17a is reduced. Therefore, when the waterproof cover 30 is fitted to the upright wall 17, the outer portion 34 can easily be fitted to the upright wall 17 while elastically deforming the outer portion 34.

Figure 5:
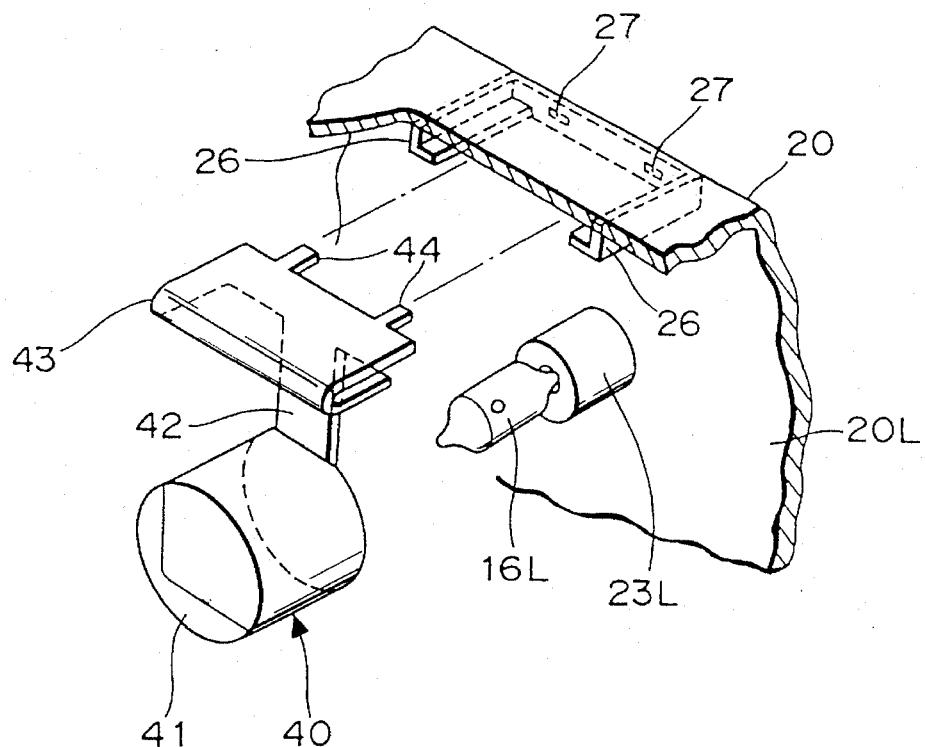
FIG. 5 is an exploded perspective view showing a shade for a low-beam lamp.

FIG. 5 is an exploded perspective view showing a shade for the low beam lamp LL, of which the cross section is shown in FIG. 3. As shown in FIG. 5, a pair of rails 26, extending longitudinally, are mounted on a portion of the reflecting surface portion 20L of the reflector 20 located directly above the bulb 16L held thereby. The paired rails 26 are used for mounting a shade 40 on the reflecting surface portion 20L of the reflector 20. With provision of the shade 40, the light emitted from the bulb 16L is prevented from being directly projected forward. The shade 40 is made of metallic material of high heat-resistance. In this embodiment, the shade 40 takes the form of a cap 41 which covers the front side of the bulb.

The cap 41 includes a narrow leg 42 formed on the top thereof. A coupling part 43, continuous with the top of the leg 42, is expanded to a width corresponding to the distance between the paired rails 26. The coupling part 43, as shown, has the form of a folded wide plate horizontally extending forward at a right angle to the narrow leg 42. The upper side and the lower side of the folded wide plate are connected together at one end and opened at the other end. At the open end of the coupling part 43, a pair of extended parts 44 extend from the end of the upper side of the coupling part 43.

As shown in FIG. 3, the upper side of the coupling part 43 is inserted into the space between the rails 26. In this state, both sides of the coupling part 43 are vertically held by the reflector 20 and the rails 26. The extended parts 44 of the upper side of the coupling part 43 are inserted into slits 27 of the reflector 20. The extended parts 44 inserted into and protruding from the slits 27 are bent upward and to the rear side of the reflector 20 so that the extended parts 44 are fixed to the reflector 20. In this way, the shade 40 is fastened to the reflector 20.

The inner surface of the cap 41 is colored black to minimize the reflection of light incident thereon. The surface of the shade 40 in the area from the cap 41 to the narrow leg 42 and the coupling part 43 is coated by aluminum by coating or vapor deposition process, similar to the reflector 20. With the coating of aluminum, when viewing the inside of the headlamp, the shade 40 and the reflector 20 are seen in integral form.

Heat generated when the bulb 16L is lit is radiated toward the reflecting surface portion 20L of the reflector 20 located directly above the bulb. In the structure using the shade 40, the coupling part 43 of the metal shade, which is supported by the rails 26, extends widely over this portion of the reflecting surface portion 20L. The coupling part 43 shuts off the direct radiation of the heat toward the reflector 20. The shut-off effect of heat by the coupling part 43 prevents the reflector 20 from being overheated. In this sense, the heat resistance performance of the reflector is improved. The cap 41 is heated by the bulb 16L. The heat of the cap 41 is transmitted through the narrow leg 42 to the coupling part 43.

Since the coupling part 43 is wide, it has a large heat radiation area. Accordingly, the coupling part 43 efficiently radiates the received heat. The leg 42 is too narrow to block light emitted from the bulb 16L and reflected by the reflector 20.

Figure 6:
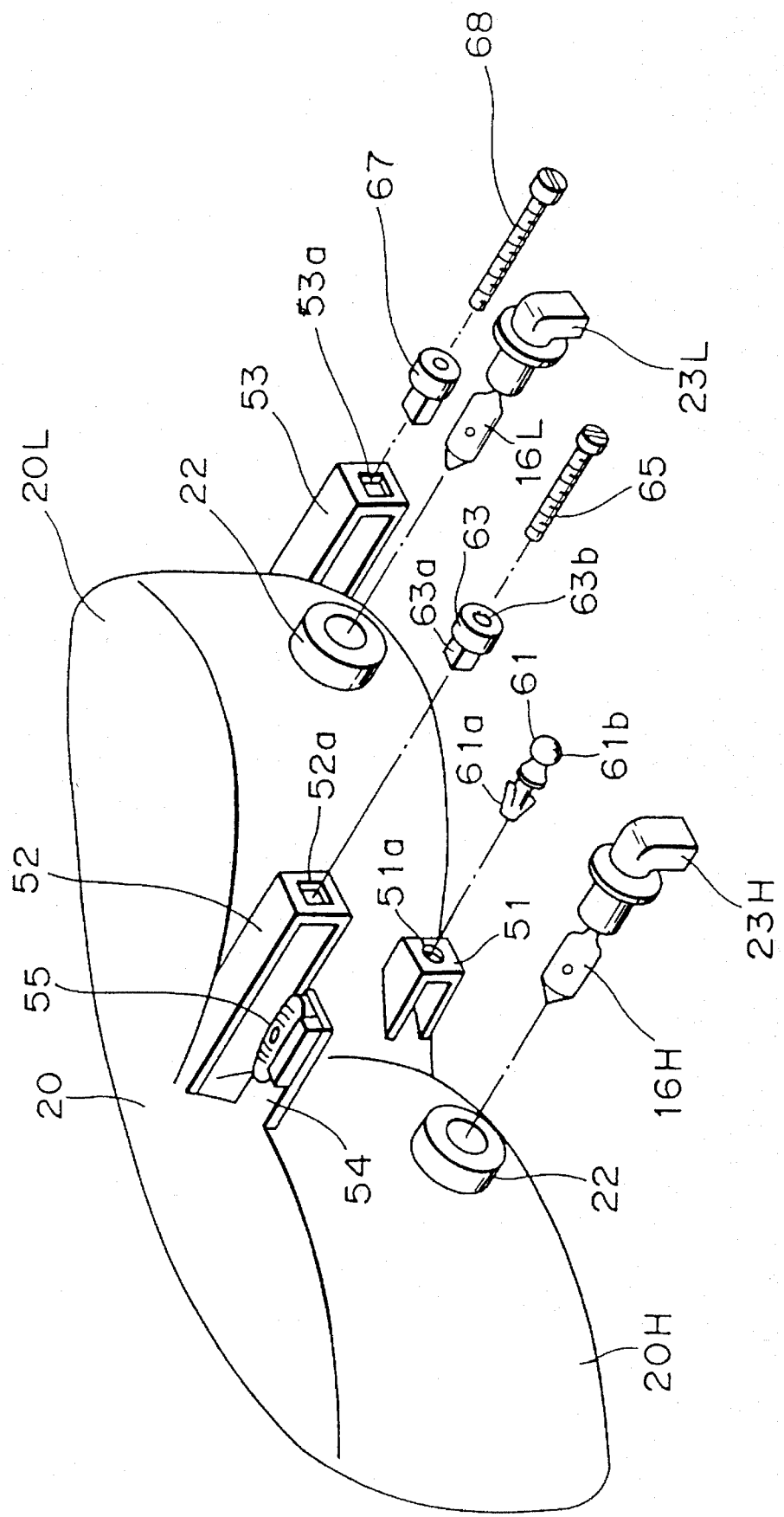
FIG. 6 is an exploded, perspective view showing a key portion of the rear side of a reflector.
Figure 7A:
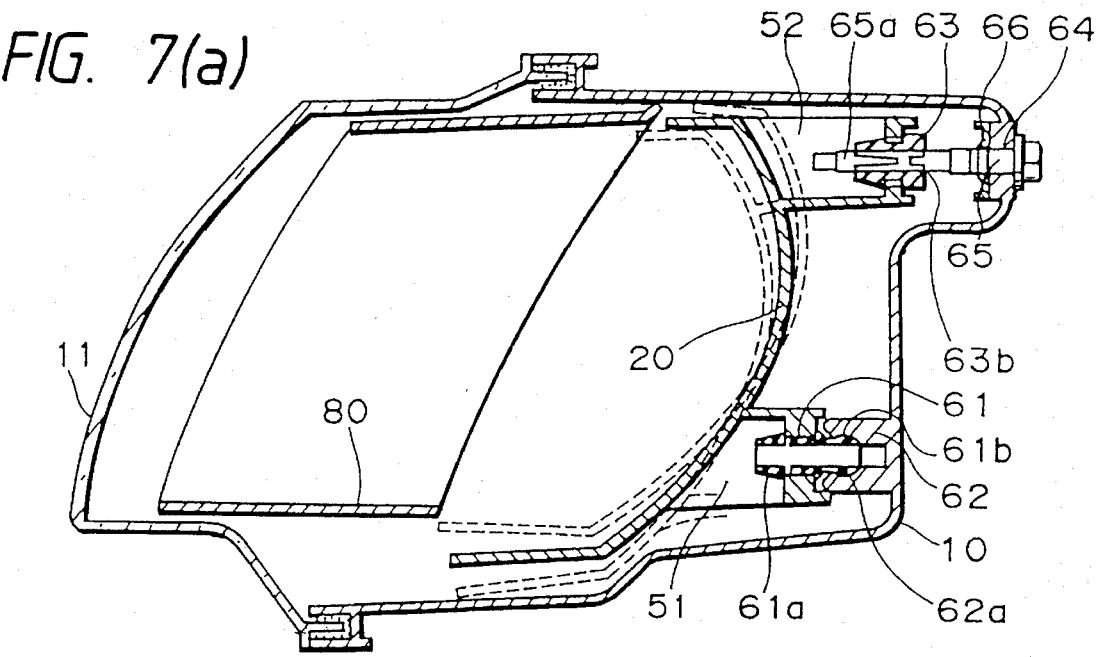
FIG. 7(a) is an enlarged cross-sectional view taken on a line 7a—7a in FIG. 1.

Within the lamp body 10, the reflector 20 is vertically and horizontally tiltable so as to permit adjustment of the optical axes of the bulbs 16H and 16L mounted thereon. L-shaped brackets 51, 52 and 53, which are respectively provided at three positions O, Y and X on the rear side of the reflector, extend rearward as shown in FIG. 6, which shows the configuration of the rear side of the reflector. The position O is located at the right lower corner, the position Y, at the right upper corner, and the position X, at the left lower corner when viewed from the front of the headlamp shown in FIG. 1. As also shown in FIG. 7(a), which is an enlarged cross-sectional view taken on line 7a—7a in FIG. 1, the bracket 51 located at the right lower corner has a hole 51a formed in the base of the shape L of the bracket. The hole 51a receives a clip pin 61. The clip pin 61 includes a clip part 61a having a pair of radially deformable clip pieces at one end thereof, and a ball part 61b formed at the other end.

By inserting the clip part 61a of the clip pin 61 into the hole 51a of the bracket 51, the clip pieces of the clip part 61a are fitted to the inner edge of the hole 51a of the bracket 51, so that the clip pin 61 is fixed to the bracket 51. A pivot receiving portion 62 is integrally formed at a location on the inner surface of the lamp body 10 which corresponds to the clip pin 61. The pivot receiving portion 62 has a spherical concavity 62a formed therein. The ball part 61b of the clip pin 61 is forcibly put into the spherical concavity 62a of the pivot receiving portion 62. The pivot receiving portion 62 includes a plural number of resilient pieces circumferentially arrayed therein. In putting the ball part 61b of the clip pin 61 into the pivot receiving portion 62, the resilient pieces are radially deformed to allow the ball part 61b to enter the pivot receiving portion 62. In a state where the clip pin 61 is received in the pivot receiving portion 62, the reflector 20 can be vertically and horizontally tilted with the ball part 61b as a fulcrum.

The bracket 52 located at the right upper corner has an hole 52a formed in the base of the L-shaped bracket. The hole 52a receives a clip nut 63. The clip nut 63 includes a clip part 63a having a pair of radially deformable clip pieces at one end thereof. The clip nut 63 includes a threaded hole formed therein, which serves as a female thread 63b. By inserting the clip part 63a of the clip nut 63 into the hole 52a of the bracket 52, the clip pieces are fitted to the inner edge of the hole, and the clip nut 63 is fixed to the bracket 52. A through-hole 64 is formed at a location on the rear side of the lamp body 10 which corresponds to the clip nut 63. A vertical aiming screw 65 is inserted into the through-hole 64 from the rear side.

The vertical aiming screw 65 is supported by the lamp body 10 in a manner such that it is axially rotatable but unremovable from the lamp body 10. In supporting the vertical aiming screw 65 by the lamp body 10, a snap washer 66, for example, is applied to the vertical aiming screw 65 inside the lamp body 10. A threaded part 65a of the vertical aiming screw 65 is screwed into the clip nut 63. With this structure, by turning the vertical aiming screw 65 from the rear side of the lamp body 10, the clip nut 63 and the bracket 52 screwed thereinto are moved in the axial direction of the vertical aiming screw 65, and the reflector 20 is vertically tilted about the clip pin 61 in the vertical plane, thereby to adjust the vertical tilt angle.

Figure 7B:
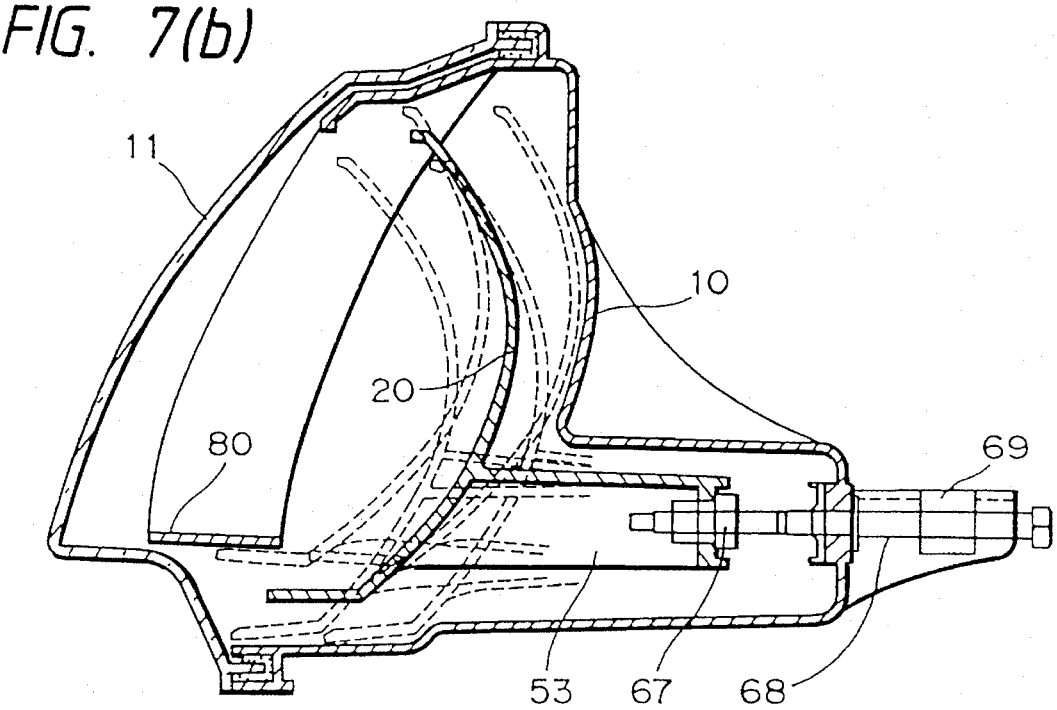
FIG. 7(b) is an enlarged cross-sectional view taken on a line 7b—7b in FIG. 1.

As also shown in FIG. 7(b), showing an enlarged cross-sectional view taken on line 7b—7b in FIG. 1, the bracket 53 located at the left lower corner also includes a hole 53a. The hole 53a receives a clip nut 67. The construction of the clip nut 67 is the same as that of the clip nut 63. A horizontal aiming screw 68 is screwed into the clip nut 67. The horizontal aiming screw 68, like the vertical aiming screw 65, is axially rotatably supported on the lamp body 10 by means of a snap washer 66, for example. With this structure, by turning the horizontal aiming screw 68, the clip nut 67, and the bracket 53 are moved in the axial direction of the horizontal aiming screw 68, and the reflector 20 is tilted about the clip pin 61 in the horizontal plane so as to adjust the horizontal tilt angle of the headlamp.

A scale plate 69 for visually checking the amount of movement of the horizontal aiming screw 68 is provided on the rear side of the lamp body 10, in connection with the horizontal aiming screw 68. One can thus visually check the reference position and deviation of the reflector 20 from the reference position in the horizontal direction.

Figure 8:
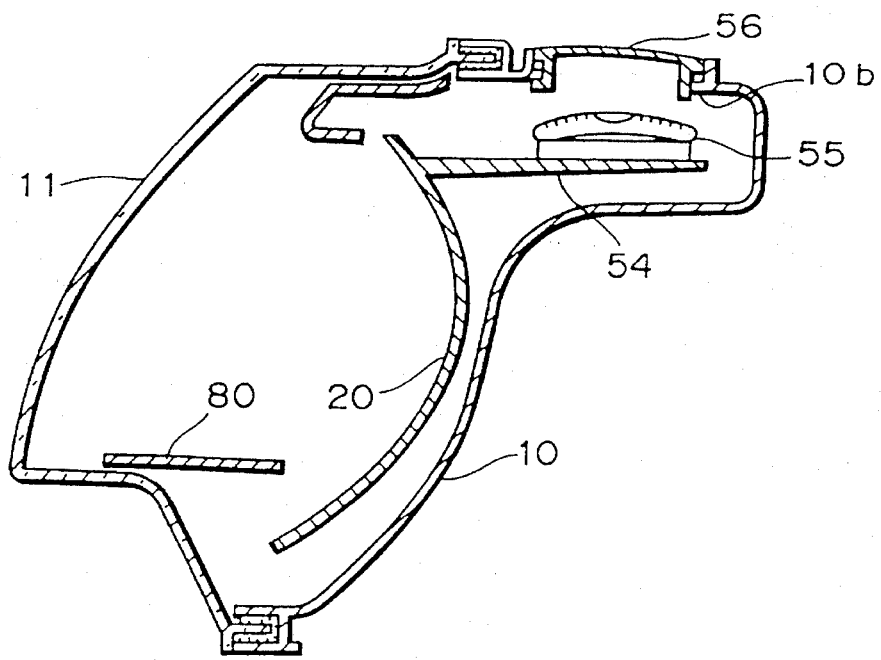
FIG. 8 is an enlarged cross-sectional view taken on line 8—8 in FIG. 1.

As shown in FIG. 6, a stem 54, located adjacent to the bracket 52, extends rearward from the reflector 20 along the optical axis of the reflector. A level vial 55 is mounted on the rear end part of the stem 54 by means of a holder and screws (not shown). The level vial 55 is a bubble tube of well-known construction consisting of an arcuate sealed glass tube marked with a scale and which contains colored liquid therein. In the tube, a bubble moves along the scale depending on the tilt angle of the reflector 20 when it is vertically tilted. As shown in FIG. 8, showing an enlarged cross-sectional view taken on line 8—8 in FIG. 1, the lamp body 10 has a circular opening 10b. The circular opening 10b is located just about the level vial 55. The circular opening 10b is covered with a transparent cap 56. Through the transparent cap 56, one can see the scale of the level vial 55 from the outside of the lamp body 10.

Figure 9A:
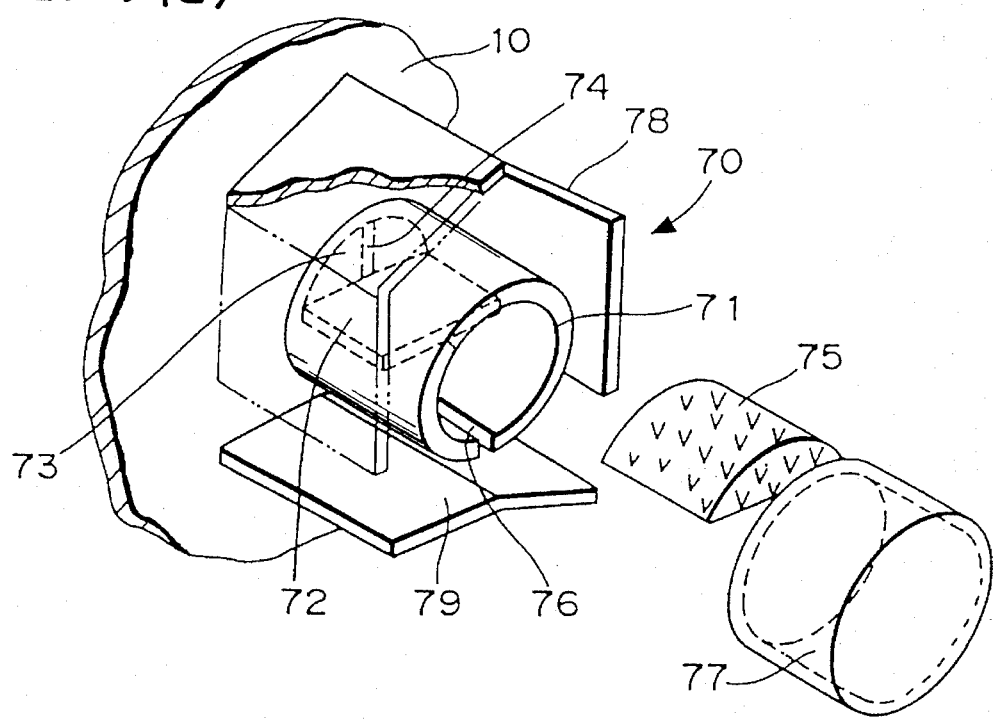
FIG. 9(a) is a perspective view showing a ventilation hole structure.
Figure 9B:
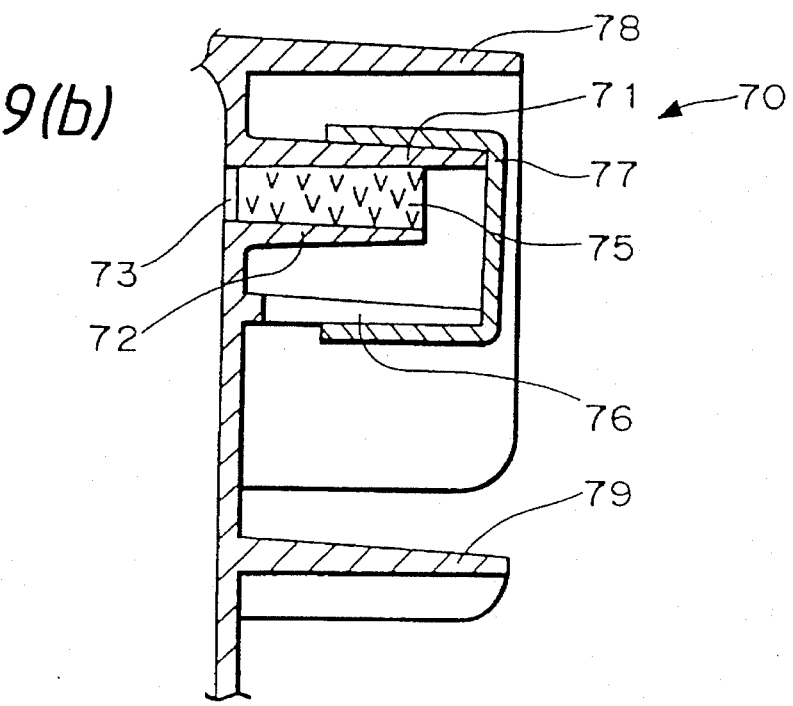
FIG. 9(b) is an enlarged cross-sectional view showing the ventilation hole structure.

A ventilation hole structure 70 is provided on the rear side of the lamp body 10. A perspective view of the ventilation hole structure 70 is shown in FIG. 9(a), and an enlarged cross-sectional view thereof is shown in FIG. 9(b).

The ventilation hole structure 70 allows air to circulate from the inside of the lamp body 10 to the outside thereof and vice versa for ventilation.

The structure of the ventilation hole structure 70 will now be described. As shown, the ventilation hole structure 70 includes a tubular portion 71 directed rearward from the rear side of the lamp body 10. A partition plate 72, shorter than the tubular portion 71, horizontally partitions the inner space of the tubular portion 71 into upper and lower spaces, each semicircular in cross section. Within the semicircular upper space, a semicircular opening 73 is vertically segmented into two openings by a crosspiece 74. A filter 75 is placed in the upper space of the inner space of the tubular portion 71. The filter 75 filters out the contaminated air flowing through the opening 73 and the upper space. The filter 75 is made of synthetic resin fiber containing rubber particles. The filter 75 thus constructed absorbs contaminating particles contained in the gas exhausted from the engine, to thereby block the flow of the contaminating particles into the lamp body 10. The crosspiece 74 prevents the filter 75 from dropping into the lamp body 10 through the opening 73.

The bottom of the tubular portion 71, defining the lower space in cooperation with the partition plate 72, is longitudinally cut out to form a slit 76. The open end of the tubular portion 71 is covered with a tubular cap 77. With the cap, the partitioned inner space of the tubular portion 71 is kept from sight.

Above the tubular portion 71, an upper cover 78, shaped like an inverted U, extends from the rear side of the lamp body 10. The upper cover 78 protects the tubular portion 71 against water droplets which otherwise would drop thereon. Under the tubular portion 71, an under cover 79 also extends from the rear side of the lamp body 10. The under cover 79 is provided for preventing water droplets from sticking to the tubular portion 71 or from entering into the tubular portion 71 through the slit 76.

Provision of the ventilation hole structure 70 allows the lamp chamber to communicate with the outside thereof. With this construction, water droplets are prevented from entering the lamp chamber, and no condensation takes place inside the lamp chamber.

Air flows through the semicircular opening 73, the filter 75, and the slit 76. The opening 73 and the slit 76 cooperate with the partition plate 72 to form a labyrinth structure. With this structure, entering of water into the lamp body 10 by way of the semicircular opening 73 is effectively blocked. Further, the filter 75 filters out contaminating particles to keep the inside of the lamp body 10 clean.

Figure 10:
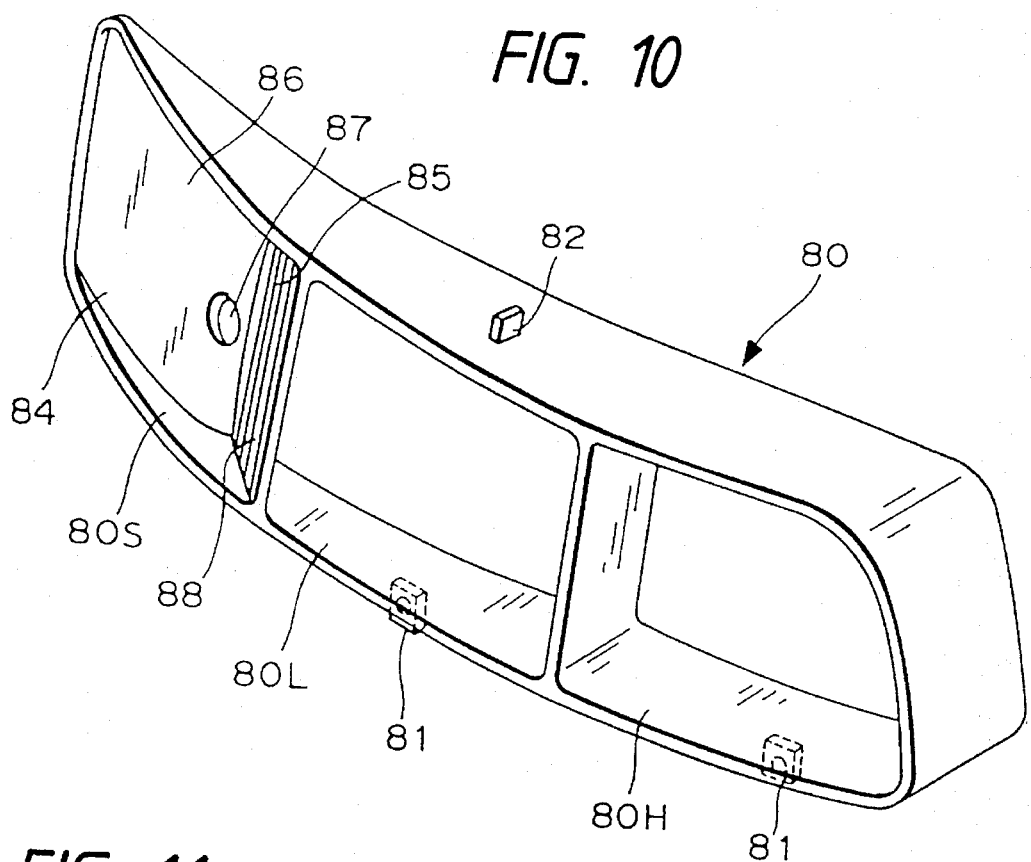
FIG. 10 is a perspective view showing an extension reflector.
Figure 11:
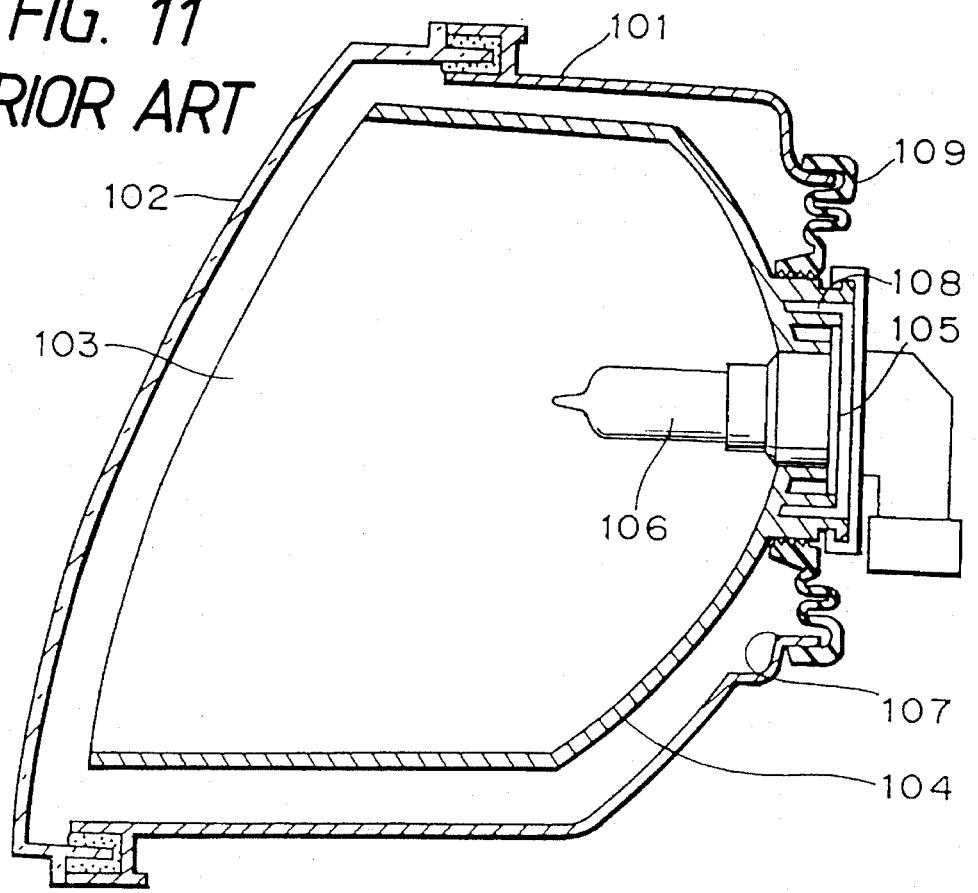
FIG. 11 is a longitudinal sectional view showing a conventional vehicular lamp with a waterproof cover.
Figure 12A:
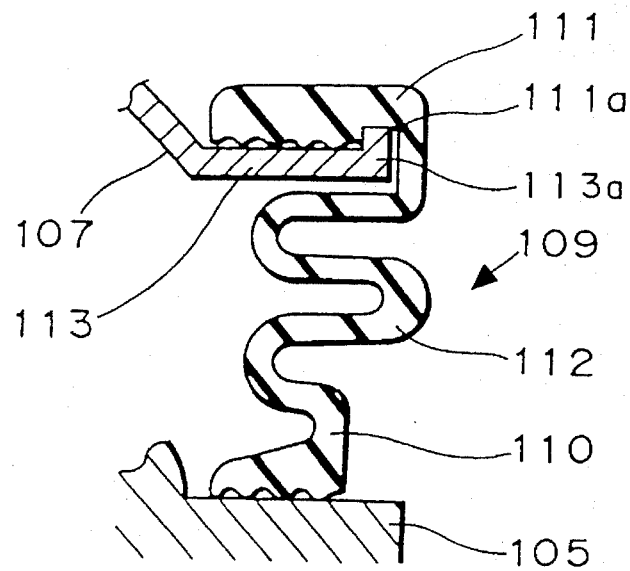
FIG. 12(a) is a cross-sectional view showing the coupling structure of the waterproof cover of the conventional vehicular lamp.
Figure 12B:
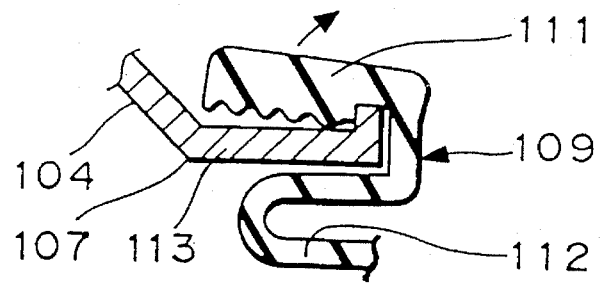
FIG. 12(b) is a cross-sectional view showing a narrowed contact area of the waterproof cover against the reflector in the coupling structure of the waterproof cover.
Figure 12C:
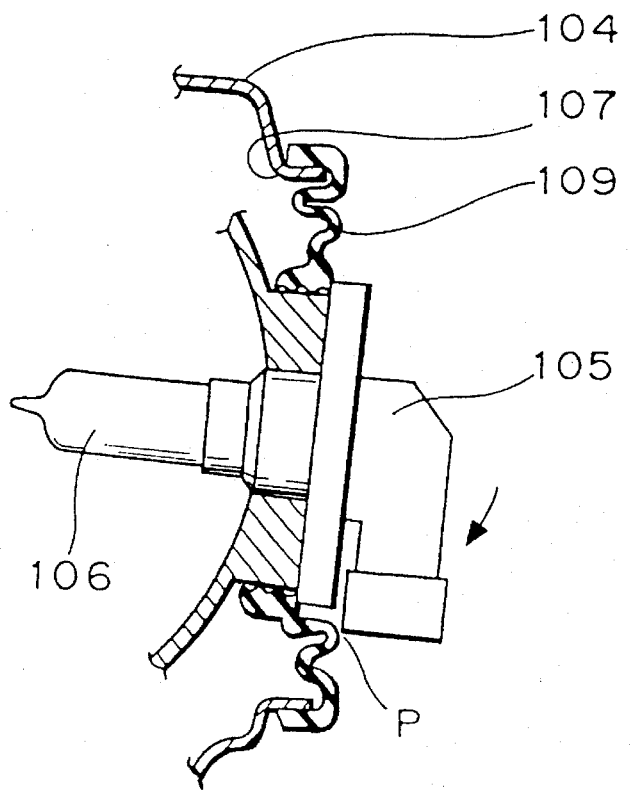
FIG. 12(c) is a cross-sectional view showing a state where a part of the bulb socket components contacts the waterproof cover when the reflector is tilted for aiming adjustment.

An extension reflector 80 is disposed within the lamp chamber 12 defined by the lamp body 10 and the lens 11. To form the extension reflector 80, resin is molded in a one piece construction. The surface of the resultant structure is coated with aluminum by coating or a vapor deposition process. For this, reference is made to FIG. 10 showing a perspective view of the extension reflector 80. A mounting piece 81 protrudes from the lower surface of the extension reflector 80, and a protruding engaging piece 82 protrudes from the upper surface thereof. Within the lamp chamber 12 of the lamp body 10, the extension reflector 80 is fastened to the lens 11 in a manner such that the mounting piece 81 is secured to the lens 11 by means of a screw 83 (FIG. 3), and the protruded engaging piece 82 is firmly coupled with an engaging part 11b (FIG. 3) of the lens 11.

The extension reflector 80 covers all three lamp sections. The low and high beam lamp sections of the extension reflector 80 are formed as frames. These frame-like sections 80H and 80L of the extension reflector 80 are disposed between the reflector 20 and the lens 11 so as to conceal the blackened inner surface of the lamp body 10, which is exposed around the reflector 20. Otherwise, the blackened inner surface of the lamp body 10 can be seen from the outside through the lens 11. The shape, dimensions and position of the extension reflector 80 are selected so as to allow the reflector 20 to be vertically and horizontally tilted by the aiming mechanisms without interference with the extension reflector 80.

A section 80S of the extension reflector 80, which corresponds to the side marker lamp SL, serves as a reflector 84 for the side marker lamp SL, as shown in FIGS. 2 and 10. The reflector 84 includes a major portion 86 and a boundary portion 85. The reflector 84 of the extension reflector 80 is shaped so as to provide a predetermined light distribution characteristic of the side marker lamp SL. The boundary portion 85 of the reflector 84, separating the reflector 84 from the low beam lamp LL, extends upward to a level in proximity to the inner surface of the lens 11. The remaining portion or the major portion 86 of the reflector 84 extends along the inner surface of the lamp body 10. The major portion 86 of the reflector 84 has a bulb mounting hole 87 formed therein, which is aligned with the bulb insertion hole 15 of the lamp body 10. A bulb socket 23S (FIG. 2) is mounted in this bulb mounting hole 87 and the bulb insertion hole 15. For the mounting structure, the bulb mounting hole 87 takes the form of a bayonet hole (not illustrated). The bulb socket 23S is provided with a bayonet piece. Through the coupling of the bayonet piece of the bulb socket 23S with the bayonet hole of the bulb mounting hole 87, the bulb socket 23S is removably attached to the bulb mounting hole 87. The bulb socket 23S supports the bulb 16S in the side marker lamp section.

The combination-type headlamp thus far discussed contains the three lamps HL, LL and SL. The combination headlamp, although it contains three lamps, may be constructed with only two reflector components, i.e., one reflector 20 common to the high beam lamp HL and the low beam lamp LL, and one extension reflector 80 common to the reflector for the side marker lamp SL and to the extension reflectors for the remaining lamps. When the reflector 84 for the side marker lamp SL is mounted on the lamp body 10, the extension reflector 80 is, of necessity, mounted on the lamp body 10. Accordingly, by subsequently assembling the reflector 20, which is common to the high and low beam lamps HL and LL, into the lamp body 10, the assembly work of the reflectors 20 and 80 is completed. Thus, the assembly work is very simple.

Further, the molding processes of the reflector 84 and the extension reflector 80 and the coating of aluminum are concurrently carried out. Accordingly, the number of manufacturing steps is reduced and an easy manufacturing is realized.

A number of protrusions, shaped like sawteeth in cross section, are formed in the inner surface of the boundary portion 85 as a part of the reflector 84 of the side marker lamp SL. These protrusions form a specific reflecting portion 88. Part of the light emitted by the bulb 16S is reflected by the reflecting portion 88 sideways, i.e., toward the lens area corresponding to the curved part 11A of the lens 11, which extends to the side of the vehicle body.

When the bulb 16S is lit, part of the light emitted by the bulb 16S is directed by the reflecting portion 88 sideways, i.e., toward the lens area 11A of the lens 11 located farther from the bulb 16S. Accordingly, the lens area 11A is heated by the light energy causing its temperature to rise, and thereby preventing a further temperature drop in the lens area 11A than in the lens areas for the other lenses. As a result, cooling of the air in the lamp chamber in the lens area 11A of the curved part is prevented, as well as condensation of water on the surface of the lens, which could make the lens dim. Accordingly, the amount of light transmitted through the side marker lamp is not reduced by condensation on the lens, to thereby prevent deterioration of the light distribution characteristic while obtaining a good outward appearance.

In the above-described embodiment, the waterproof cover is constructed so as to waterproof the outer surface of the socket support section of the reflector and the opening of the lamp body. It is evident that the present invention may be applied as well for waterproofing the portion between the outer surface of the bulb socket mounted on the reflector and the opening of the lamp body. In the latter case, the inner portion of the waterproof cover is brought into tight contact with the outer surface of the bulb socket.

As seen from the foregoing description, the inner portion of the waterproof cover is brought into tight contact with the outer surface of the bulb socket. The outer portion of the waterproof cover is fitted to the upright wall of the lamp body in a state such that it sandwiches the upright wall. Accordingly, when the waterproof cover is elastically restored after being mounted, deformation of the outer portion of the waterproof cover is minimized, a close contact is secured between the upright wall and the outer portion of the waterproof cover, and good waterproofing is obtained.

The outer portion, shaped like a "U" in cross section, of the waterproof cover consists of the inner part and the outer part, which are connected by a connection part. The outer portion of the waterproof cover is fitted to the upright wall in such a state that the upright wall is sandwiched by the inner part and the outer part of the outer portion of the waterproof cover. Width this structure, the mounting of the waterproof cover is easy. The waterproofing ability is further improved since the three sides of the upright wall 17 are covered by the outer portion of the waterproof cover.

The protruded engaging part protruding from the inner surface of the upright wall engages the engaging part of the inner part of the outer portion in the axial direction of the opening. With this structure, the outer portion of the waterproof cover is prevented from slipping off the upright wall, a reliable engaging state thereof is ensured, and the waterproofing effect is further enhanced.

Particularly, the engaging part 38 and the protruded engaging part 17A are located on the inner side of the opening. This allows the middle portion 33 to be located closer to the inner side of the opening. When the bulb socket, together with the reflector, is tilted for the aiming adjustment, the connector of the bulb rarely interferes with the waterproof cover, thereby ensuring smooth movement of the related component parts used for the aiming adjustment.

While there has been described what is at present considered to be the preferred embodiment of the present invention, it will be understood that the present invention may variously be modified, altered and changed within the spirit and scope of the present invention.

What is claimed is:

1. In a vehicular lamp having a waterproof cover and in which a reflector is contained within a lamp body, the lamp body including an opening into which a bulb socket supported by the reflector is inserted, and the waterproof cover waterproofing said opening, the improvement wherein a wall is formed along a circumferential edge of said opening, an inner portion of the waterproof cover is in close contact with a circumferential surface of at least one of the reflector and the bulb socket, and an outer portion of the waterproof cover comprises an inner part and an outer part connected to each other by a connection part, wherein at least a portion of said wall is sandwiched between said inner part and said outer part, and a first engaging part protrudes from an inner surface of said wall, said first engaging part engaging a second engaging part protruding from said inner part of the outer portion of the waterproof cover to secure the outer portion to said wall.

2. The vehicular lamp according to claim 1, wherein said outer part and at least a portion of said inner part are each thicker than said connection part.

3. The vehicular lamp according to claim 1, wherein said connection part is thicker than a middle portion of the waterproof cover disposed between said inner portion and said outer portion.

4. The vehicular lamp according to claim 1, wherein the waterproof cover comprises a watertight elastic material.

5. The vehicular lamp according to claim 1, wherein said first engaging part is disposed adjacent a circumferential edge of said wall.

6. The vehicular lamp according to claim 1, wherein said first engaging part is disposed between a circumferential edge of said wall and a base portion of said wall.

7. In a vehicular lamp having a waterproof cover and in which a reflector is contained within a lamp body, the lamp body including an opening into which a bulb socket supported by the reflector is inserted, and the waterproof cover waterproofing said opening, the improvement wherein a wall is formed along a circumferential edge of said opening, an inner portion of the waterproof cover is in close contact with a circumferential surface of at least one of the reflector and the bulb socket, and an outer portion of the waterproof cover comprises an inner part and an outer part connected to each other by a connection part, wherein at least a portion of said wall is sandwiched between said inner part and said outer part, and said outer part and at least a portion of said inner part are each thicker than said connection part.

8. In a vehicular lamp having a waterproof cover and in which a reflector is contained within a lamp body, the lamp body including an opening into which a bulb socket supported by the reflector is inserted, and the waterproof cover waterproofing the opening, the improvement wherein an axially protruding wall is formed along a circumferential edge of the opening, an inner portion of the waterproof cover is in close contact with a circumferential surface of at least one of the reflector and the bulb socket, and an outer portion of the waterproof cover comprises an inner part and an outer part connected to each other by a connection part, wherein at least a portion of said axially protruding wall is sandwiched between said inner part and said outer part to secure said outer portion to said wall.

9. The vehicular lamp according to claim 8, wherein said wall protrudes in a direction substantially parallel to a central axis of said opening.

* * * * *